April 7, 1959   W. C. AMISON, JR   2,880,750
VALVE
Filed April 1, 1954   2 Sheets-Sheet 1

INVENTOR.
WILLARD C. AMISON JR.
BY
ATTORNEY

April 7, 1959  W. C. AMISON, JR  2,880,750
VALVE
Filed April 1, 1954  2 Sheets-Sheet 2

INVENTOR.
WILLARD C. AMISON JR.
BY
*Geo. J. Hyde*
ATTORNEY

United States Patent Office 2,880,750
Patented Apr. 7, 1959

2,880,750

VALVE

Willard C. Amison, Jr., Paramus, N.J., assignor to Bendix Aviation Corporation, Teterboro, N.J., a corporation of Delaware Application April 1, 1954, Serial No. 420,393

2 Claims. (Cl. 137—469)

This invention relates to valves, and particularly to improvements in valves of the type in which a yieldable washer centrally clamped to a valve head is pressed against an annular seat. It is particularly adapted for use in relief valves, in which the valve head is held by a spring against a seat surrounding an opening connected to a pressure chamber, and is lifted from the seat when the pressure exceeds the spring pressure to allow fluid to escape from the chamber.

In valves of this type it is important to maintain a complete seal against substantial fluid pressure. This is most effectively accomplished by employing a yieldable washer, which is forced against the seat with considerable pressure. Under these conditions the valves are frequently subject to sticking, and the pressure at which a given valve will open may vary from time to time. Both of these defects are serious in many instances, especially where the valve is used in connection with control apparatus whose operation depends upon accurate fluid pressure regulation.

The yieldable washer is generally the source of such unreliability, and the cause of any tendency to leak under pressure. The material of the washer must be sufficiently soft to maintain the seal regardless of minor irregularities in the seat and the washer support, and frequently consists of rubber or similar elastomeric material clamped against a backing that receives the thrust. Under the necessary pressure by a central clamp such a washer is readily distorted, and is thereby prevented from operating uniformly and without leakage. This distortion may be caused by the outward flow or extrusion of the material under central clamping pressure, resulting in distortion of the outer part of the washer, which is engaged by the valve seat. On the other hand, if the clamping pressure is reduced to avoid distortion, or if a harder material is used for the facing, the tendency to leak under pressure is increased.

The distortion may take the form of marginal deflection or curving toward the seat, which is objectionable. It has been discovered that this may be due to a thickening of the marginal portion by material forced outwardly from the clamping zone. A purpose of the invention is to prevent such deflection. This is in general accomplished by providing sufficient clearance between the outer portion of the washer and the adjacent surface of the valve head to permit said margin to expand toward the head when thickened, thereby avoiding axial deflection.

Another object is to provide uniform engagement between the seat and the marginal portion of the washer of a type which will have a minimum tendency to leak. This is accomplished by utilizing the discovery that when such portion is thickened by clamping pressure, the zone immediately adjacent to the clamp is not substantially thickened and therefore remains smooth, with a uniform plane surface against which the valve seat can bear with uniform pressure.

A further object is to provide an improved valve of the double area type, in which a narrow annular seat extends around a central area of the valve head when the valve is closed, with an additional marginal area of the valve head exposed, against which pressure is exerted, when the valve starts to open, thereby rapidly accelerating the opening movement of the head. The invention is particularly advantageous for this type of valve, since a narrow valve seat or ridge may effectively engage the inner zone of the outer portion of the washer, the remaining surface of which provides the supplemental area against which pressure is exerted when the valve opens.

An additional object is to provide a valve of this type in which a narrow seat will not penetrate excessively into a soft washer, thereby tending to cause uneven opening by engagement of the sides of the seat with the washer material, and increasing the tendency to damage the washer when soft material is utilized. This is accomplished by providing an annular relatively narrow seating ridge which initially engages and is forced into the washer, providing a tight seal, and a seating area surrounding the ridge and slightly offset from the ridge apex, positioned to engage the thickened outer part of the washer and receive the principal seating pressure when the valve is fully closed, thereby limiting the extent to which the ridge penetrates the washer.

A valve embodying this invention was developed to meet conditions present in systems for supplying oxygen to aviators, in which oxygen under relatively high pressure is supplied to an oxygen regulator from which it is fed at the proper reduced pressure to the breathing mask. If the system does not operate correctly, dangerous pressure may build up in the regulator unless prevented by the use of a relief valve. In this use it is of prime importance that the relief valve shall always operate exactly at a set pressure, and shall not leak, since opening at excessive or insufficient pressures may be dangerous, and leakage will result in the waste of oxygen that may be essential to survival.

The foregoing and other objects and advantages of the invention will appear more fully from a consideration of the detailed description which follows, taken with the accompanying drawing, wherein one embodiment of the invention is illustrated. It is to be expressly understood, however, that the drawing is for the purposes of illustration and description, and is not to be construed as defining the limits of the invention.

Figure 1:
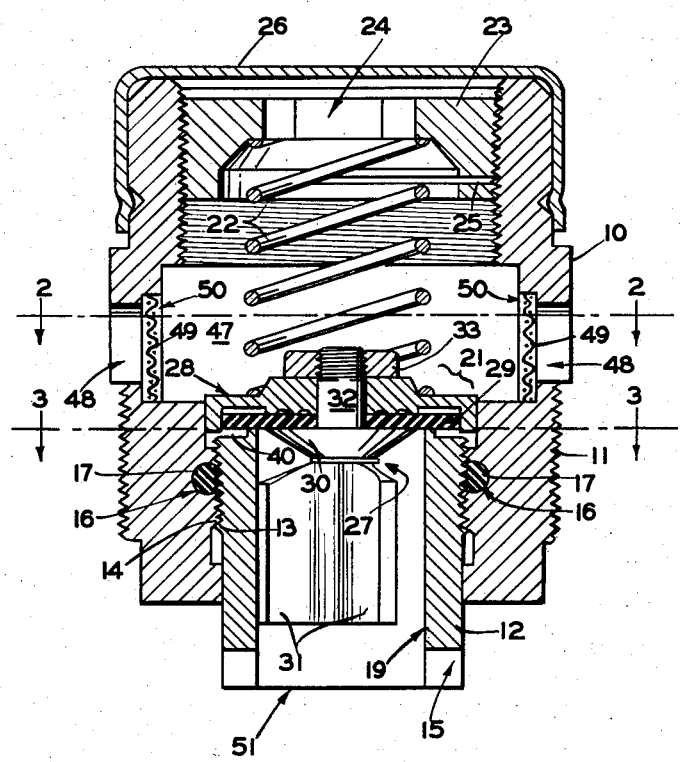
Fig. 1 is a central longitudinal sectional view through a relief valve embodying the invention.

The illustrated embodiment is a type of relief valve suitable for use with an oxygen regulator, and is adapted to be threaded into an opening in an oxygen pressure chamber in the regulator, so as to vent oxygen to the outer air when the pressure becomes excessive. It comprises a cylindrical body 10 threaded at 11 for mounting in the regulator. A longitudinally adjustable valve seat is mounted in the lower part of the body. In the form shown, a cylindrical seat body 12 is provided with threads 13 at its upper end, engaging threads 14 in the lower part of valve body 10. Seat body 12 may include a drive slot 15 and a suitable retaining or locking arrangement to hold the seat in adjusted position. As shown, the locking device is of the type described in the application of Siravo et al., Serial No. 414,371, filed March 5, 1954, now abandoned, for a Lock Nut. It comprises bores 16 (Figs. 1 and 3) drilled from opposite sides of body 10 tangentially through threads 14, with rods 17 of nylon or the like fitting the bores and frictionally engaging threads 13 on the seat body. The upper end of seat body 12 carries a seat, comprising a narrow annular seating ridge 18 with a flat top, located adjacent to and preferably in line with the inner surface 19 of seat body 12, and a flat radial seating face 20 extending outwardly from seat ridge 18. The arrangement, proportions and relationships of ridge 18 and face 20 will be indicated hereafter.

A valve head 21 is biased against seat 18 by an adjustable spring. As shown, a duplex spiral spring 22 bears against head 21 and an adjusting disk 23, recessed to receive the spring and preferably including a drive-facilitating element such as hex socket 24. Disk 23 is threaded into the upper part of body 10, and a locking arrangement may be provided, such as slot 25. A snap-on cap 26 may be employed to keep out dust.

Figure 3:
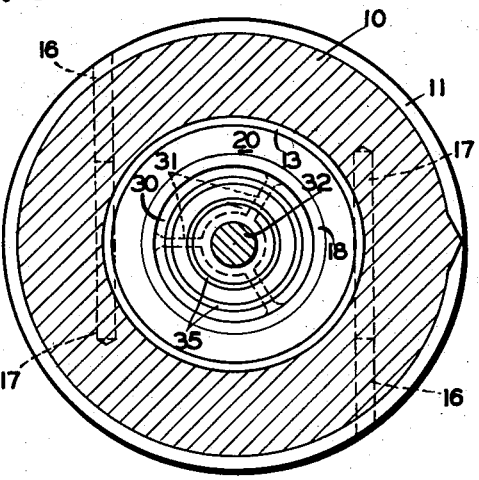
Fig. 3 is a sectional view on line 3—3 of Fig. 1.

Valve head 21 comprises a base 27, a cap 28 and a washer 29 clamped between the cap and the base. The base 27 includes a circular washer clamp head 30, tapered downwardly and carrying flanges 31 slidably fitting the inner surface 19 of seat body 12. A central stud 32 on clamp head 30 is threaded at the end to receive nut 33. The flat upper face 34 of clamp head 30 is provided with circular grooves 35 (Fig. 3). Cap 28 comprises a central portion 36 having a bore 37 slidably fitting stud 32, a marginal portion 38 against which spring 22 bears, and a cylindrical flange 39 slidably fitting the cylindrical wall 19 of recess 40 in body 10. The lower face 41 of the central portion 36 of the cap also carries circular grooves 42.

The circular washer 29 is advantageously made of rubber sufficiently thick and soft to conform adequately to the abutting surfaces. When the valve is likely to be subjected to temperature extremes, as in oxygen supply systems for aviators, the rubber should be of a type that retains its properties under such conditions. For this type of use suitable grades of silicone rubber meet the requirements, such as the type manufactured by General Electric Company, Inc., Schenectady, New York, known as Grade 15060 and described in their Technical Data Sheet dated April 6, 1953. The washer is centrally apertured to fit over stud 32, and is clamped between the upper face 34 of clamp head 30 and the registering lower central face 41 of cap 28 by tightening nut 33.

The flat contour of washer 29 before clamping pressure is applied is shown in Fig. 1. When nut 33 is tightened, the central portion 44 of washer 29 is compressed between faces 34 and 41, forcing the washer material into grooves 35 and 42 to block leakage along said faces, and squeezing out laterally some of the washer material between the faces. This necessarily produces distortion of the outer portion 45 of the washer 43.

Figure 4:
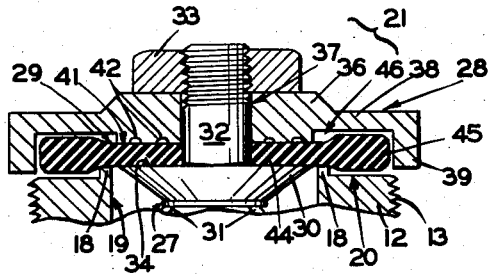
Fig. 4 is a fragmentary longitudinal sectional view through a valve head and seat, showing the washer clamped in place and in light contact with the seat.

It has been found that if such outer portion is not restricted, it will merely become thicker, without producing the axial deflection that interferes with proper operation. The outer part 38 of the lower surface of cap 28 is therefore formed with an annular face 46 slightly recessed or offset from central face 41 sufficiently to permit the registering outer portion 45 of the washer to expand without deflection by contact with face 46, the parts being advantageously proportioned so that, when the proper clamping pressure is exerted by nut 33, the outer part 45 of the washer will be substantially in contact with face 38 and adjacent to the inner face of flange 39, without being subject to material deforming deflection by either face. This condition is indicated in Fig. 4.

It has been found unexpectedly that although the outer portion 45 of the washer is distorted by thickening, there is a zone immediately adjacent to the margin of clamp head 30 that is not materially deflected by the clamping pressure. By locating seating ridge 18 so that it engages this zone, a smooth, uniform washer area is provided for seating the ridge even when the remainder of the outer part 45 of the washer is distorted.

Figure 5:
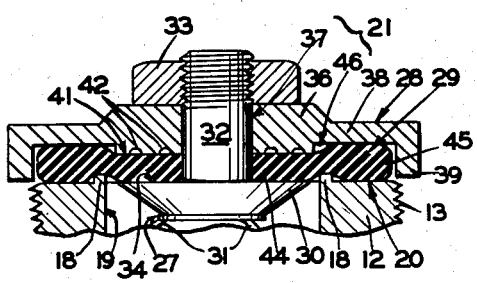
Fig. 5 is a similar view with the valve head pressed against the seat in fully closed position.
Figure 2:
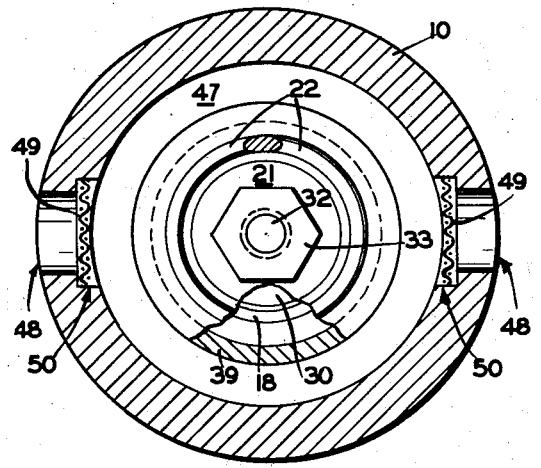
Fig. 2 is a sectional view on line 2—2 of Fig. 1.

As shown in Fig. 5, valve head 21 is normally pressed strongly against seat ridge 18 by spring 22, so that the seat will be forced into the washer 29. While this arrangement provides a good seal, it tends to damage the washer 29 under heavy pressure if the washer is made of material soft enough for good sealing. The height of seat ridge 18 above the flat seat face 20 on the seat body 12 is therefore proportioned so that, when the ridge has penetrated far enough for good sealing, face 20 will engage the outer washer portion 45 and press said portion against the backing face 46; consequently this portion of the washer will take the spring pressure, preventing further penetration by seat ridge 18.

Directly above valve head 12 in the body 10 is a discharge chamber 47, extending laterally from the outer edge of cap 28 to a suitable outlet arrangement. In the form illustrated, two opposite vents or outlets 48 to the outer air are cut through the side walls of the body 10, and advantageously are covered with screens 49 seated in recesses 50 to prevent dirt from getting into the valve.

In operation, the seat body 12 is adjusted to provide the proper length of travel of flange 39 in recess 40 before opening the connection to chamber 47, and to locate valve head 21 in the best position for the flow of fluid through vents 48 under given conditions. Adjusting disk 23 is set so that the valve will open at the selected pressure. Until that pressure is reached, valve head 21 will seal the inlet 51 as heretofore described.

As the pressure increases, it will reach a stage where fluid will leak past seat 18 into the closed space in recess 40 below the washer margin 45, increasing sharply the area subjected to upward pressure, so that the valve head 21 will be promptly pushed off of seat 18 and along recess 40 into chamber 47, being kept in alignment by guide flanges 31. The fluid will pass between the flanges and be deflected laterally by conical head 30 to the vents 48. Flow will continue as long as the fluid pressure on the entire lower surface of head 21 is greater than the pressure of spring 22. When the pressure at inlet 51 drops below that value the valve will close, and will again open only when the pressure rises to the substantially higher value required to overcome the spring pressure on the smaller area of the valve head defined by seat ridge 18.

For convenience, the material of the washer 43 has been referred to generally as rubber; but this term is used here to describe the many elastomers, both natural and synthetic, and analogous materials of the elastomer type, that have the indicated physical properties. Moreover, while the invention has special and unexpected advantages when incorporated in a valve of the type described and in apparatus of the kind indicated, various changes can be made in the design and arrangement of the parts without departing from the spirit and scope of the invention as the same will now be understood by those skilled in the art. Moreover, though but one embodiment of the invention has been illustrated and described in detail, it is to be expressly understood that the invention is not limited thereto.

I claim:

1. A valve comprising a body, a valve seat on the body, and a valve head including a washer of compressible elastomeric material, a cap and a clamping member having registering flat faces engaging opposite sides of the central portion of the washer under sufficient pressure to extrude material and thicken the outer portion of the washer, the cap including a washer-supporting area surrounding and offset from said flat face of the cap, positioned to support the thickened marginal portion of the washer without substantial distortion, the valve seat including a narrow annular seating ridge engaging said outer portion of the washer in register with the inner portion of said offset area of the cap when the valve is closed, and a flat seating area surrounding said ridge, positioned for seating engagement with the thickened outer portion of the washer when the ridge is in sealing engagement with the washer.

2. A valve comprising a body, a valve seat surrounding an inlet and including an annular seating ridge, a recess having a cylindrical side wall laterally spaced from said ridge and extending axially from the valve seat, means for adjusting the valve seat axially in relation to said recess, an outlet passage communicating with the inlet beyond the recess, a valve head having an outer margin slidably fitting against said cylindrical side wall and engaging the seating ridge to close the inlet passage, said head being movable along and beyond the recess and including deflecting means arranged to deflect fluid laterally toward the outlet when moved beyond said recess, and spring means adjustably biasing the valve head toward the seat.

References Cited in the file of this patent

UNITED STATES PATENTS

| | | |
|---|---|---|
| 411,254 | McNeil | Sept. 17, 1889 |
| 452,020 | Prince | May 12, 1891 |
| 1,119,042 | Ricketts | Dec. 1, 1914 |
| 1,132,439 | Case | Mar. 16, 1915 |
| 1,252,940 | Osborne | Jan. 8, 1918 |
| 1,322,938 | Parker | Nov. 25, 1919 |
| 1,583,140 | Goosmann | May 4, 1926 |
| 2,110,481 | Crocker | Mar. 8, 1938 |
| 2,131,928 | Abegg | Oct. 4, 1938 |
| 2,226,851 | Franck | Dec. 31, 1940 |
| 2,267,515 | Wilcox | Dec. 23, 1941 |
| 2,431,769 | Parker | Dec. 2, 1947 |
| 2,563,244 | Holicer | Aug. 7, 1951 |
| 2,668,555 | Bartolat | Feb. 9, 1954 |

FOREIGN PATENTS

| | | |
|---|---|---|
| 597,093 | Germany | Dec. 9, 1932 |
| 390,695 | Great Britain | Apr. 13, 1933 |